US012015189B2

(12) United States Patent
Furlan

(10) Patent No.: US 12,015,189 B2
(45) Date of Patent: Jun. 18, 2024

(54) IN-GLASS HIGH PERFORMANCE ANTENNA

(71) Applicant: TAOGLAS GROUP HOLDINGS LIMITED, Enniscorthy (IE)

(72) Inventor: Vladimir Furlan, Munich (DE)

(73) Assignee: Taoglas Group Holdings Limited, Enniscorthy (IE)

( * ) Notice: Subject to any disclaimer, the term of this patent is extended or adjusted under 35 U.S.C. 154(b) by 29 days.

(21) Appl. No.: 17/987,116

(22) Filed: Nov. 15, 2022

(65) Prior Publication Data

US 2023/0187809 A1 Jun. 15, 2023

Related U.S. Application Data

(63) Continuation of application No. 17/164,097, filed on Feb. 1, 2021, now Pat. No. 11,509,036, which is a (Continued)

(51) Int. Cl.
*H01Q 1/12* (2006.01)
*H01P 3/08* (2006.01)
(Continued)

(52) U.S. Cl.
CPC ........... *H01Q 1/1271* (2013.01); *H01P 3/085* (2013.01); *H01P 5/1007* (2013.01); *H01Q 1/12* (2013.01);
(Continued)

(58) Field of Classification Search
CPC ........ H01Q 1/1271; H01Q 1/12; H01Q 1/243; H01Q 1/24; H01Q 1/3233; H01Q 1/32;
(Continued)

(56) References Cited

U.S. PATENT DOCUMENTS

| | | |
|---|---|---|
| 4,870,375 A | 9/1989 | Krueger, Jr. et al. |
| 6,677,909 B2 | 1/2004 | Sun et al. |

(Continued)

FOREIGN PATENT DOCUMENTS

| | | |
|---|---|---|
| KR | 101209620 | 12/2012 |
| WO | 2012079029 | 6/2012 |
| WO | 2016141177 | 9/2016 |

OTHER PUBLICATIONS

Mudegaonkar, et al. A microstrip-line-fed suspended square slot microstrip antenna for circular polarization operations, Communications on Applied Electronics 1(3) Feb. 2015.

*Primary Examiner* — Hai V Tran
(74) *Attorney, Agent, or Firm* — Garson & Gutierrez, PC

(57) ABSTRACT

Disclosed is an antenna including a radiating element, a co-planar ground plane element and a transmission line extending across at least a portion of the radiating element and the ground plane element. The transmission line includes a dielectric layer. The dielectric layer has a portion of a first major surface adjacent to the ground plane and a second major surface opposite and separated from the first surface. A shield is formed on the second major surface. At least one via extends through the dielectric layer to connect the shield to the ground plane. A feed line extends longitudinally through the dielectric layer from a feed point at a proximal end of the transmission line towards a distal end of the transmission line, the feed line being shielded along a portion of its length extending across the ground plane element by the shield with the distal end of the transmission line lying in register with the radiating element and coupling the feed line to the radiating element.

20 Claims, 10 Drawing Sheets

Related U.S. Application Data continuation of application No. 16/192,191, filed on Nov. 15, 2018, now Pat. No. 10,910,692.

(60) Provisional application No. 62/591,221, filed on Nov. 28, 2017.

(51) Int. Cl.

| | |
|---|---|
| ***H01P 5/10*** | (2006.01) |
| ***H01Q 1/22*** | (2006.01) |
| ***H01Q 1/24*** | (2006.01) |
| ***H01Q 1/32*** | (2006.01) |
| ***H01Q 1/48*** | (2006.01) |
| ***H01Q 1/52*** | (2006.01) |
| ***H01Q 9/28*** | (2006.01) |
| ***H01Q 13/10*** | (2006.01) |
| ***H01Q 21/26*** | (2006.01) |
| ***H01Q 21/28*** | (2006.01) |

(52) U.S. Cl.

CPC ........... *H01Q 1/2283* (2013.01); *H01Q 1/243* (2013.01); *H01Q 1/3233* (2013.01); *H01Q 1/48* (2013.01); *H01Q 1/52* (2013.01); *H01Q 1/526* (2013.01); *H01Q 9/285* (2013.01); *H01Q 13/10* (2013.01); *H01Q 21/26* (2013.01); *H01Q 21/28* (2013.01)

(58) Field of Classification Search

CPC ............ H01Q 1/48; H01Q 1/526; H01Q 1/52; H01Q 21/28; H01Q 21/26; H01Q 1/2283; H01Q 9/285; H01Q 13/10; H01P 3/085; H01P 3/08; H01P 5/1007

USPC .......................................................... 343/713

See application file for complete search history.

(56) References Cited

U.S. PATENT DOCUMENTS

| | | | | |
|---|---|---|---|---|
| 6,963,312 | B2 | 11/2005 | Schuneman et al. | |
| 7,271,779 | B2 | 9/2007 | Hertel | |
| 8,362,958 | B2 | 1/2013 | Lin et al. | |
| 8,427,373 | B2 | 4/2013 | Jiang et al. | |
| 9,166,300 | B2 | 10/2015 | Taura | |
| 9,257,747 | B2 * | 2/2016 | Flores-Cuadras ........ | H01Q 5/40 |
| 9,391,372 | B2 * | 7/2016 | Hwang .................. | H01Q 1/243 |
| 9,472,855 | B2 * | 10/2016 | Toyao .................... | H01Q 1/243 |
| 9,653,807 | B2 | 5/2017 | Binzer et al. | |
| 9,660,350 | B2 | 5/2017 | Lo Hine Tong et al. | |
| 2005/0200557 | A1 * | 9/2005 | Tanaka .................... | H01P 3/003 343/904 |
| 2011/0221652 | A1 | 9/2011 | Li et al. | |
| 2012/0068896 | A1 * | 3/2012 | White .................. | H01Q 1/1271 343/713 |
| 2012/0127050 | A1 | 5/2012 | Song et al. | |
| 2013/0099981 | A1 * | 4/2013 | Vortmeier ................ | H01Q 1/32 343/700 MS |
| 2013/0257664 | A1 * | 10/2013 | Kagaya ................ | H01Q 1/1271 343/720 |
| 2013/0321212 | A1 | 12/2013 | O'Shea et al. | |
| 2014/0060921 | A1 | 3/2014 | Reul et al. | |
| 2014/0111393 | A1 | 4/2014 | Tong et al. | |
| 2015/0091763 | A1 | 4/2015 | Tong et al. | |
| 2015/0364823 | A1 | 12/2015 | Hashimoto et al. | |
| 2016/0134021 | A1 | 5/2016 | Helander et al. | |
| 2017/0279177 | A1 * | 9/2017 | Oguri ....................... | H03H 7/38 |

* cited by examiner

IN-GLASS HIGH PERFORMANCE ANTENNA

PRIORITY

This application is a continuation of, and claims the benefit of priority to, U.S. patent application Ser. No. 17/164,097 filed Feb. 1, 2021 of the same title, which is a continuation of, and claims the benefit of priority to, U.S. patent application Ser. No. 16/192,191 filed Nov. 15, 2018 of the same title, which claims the benefit of priority to U.S. Provisional Application No. 62/591,221, filed Nov. 28, 2017, entitled ANTENNA, each of the foregoing being incorporated herein by reference in its entirety.

BACKGROUND

Field

The present disclosure relates to an antenna.

Background

With the growth of wireless communications and the proliferation of wireless communication devices and systems, antennas have found broad implementation as a result of their favorable properties and relatively simple design and fabrication. One form of antenna known as a slot antenna comprises a thin flat metal layer with one or more holes or slots removed. A feed line can be connected to the thin flat metal layer and either driven by connected transmitter circuitry at a required frequency or frequencies; or the feed line can be connected to a receiver tuned to pick up a signal at a required frequency or frequencies from the layer; or the feed line can be connected to both receiver and transmitter circuitry; or the feed line can be connected to transceiver circuitry. Typically, a coaxial feed line is attached to the surface of the antenna via manual solder-bonding. Even relatively slim coaxial feed lines can vary in diameter from about 810 μm to 1 130 μm and so comprise the major portion of the thickness of the antenna, the remainder comprising the thickness of the layer itself One potential application for antenna devices is within a window panel such as a windshield of an automotive vehicle, although it will be appreciated that there may be many other applications where only limited clearance is available for incorporating an antenna. Typically, such windshields are fabricated by laminating at least 2 layers of glass with a layer of plastic material in between the two glass layers. Such windshields may provide a gap of about 800 μm between the layers of glass and this gap can be utilized for integrating a windshield heating element, amplitude modulation (AM), frequency modulation (FM) antenna elements or both AM and FM antenna elements. The fabrication process of an automotive vehicle windshield exposes the layers of glass to high pressures and high temperatures, and such fabrication conditions need to be taken into account when designing an in-glass high performance antenna for integration between the layers of glass of the windshield.

In order to feed such antennas with a transmission line, such as a coaxial feed line, a feed line would need a diameter significantly less than 800 μm. However, it will be appreciated that as the diameter of a coaxial feed line reduces, performance issues and increases in losses within the cable occur, thereby affecting the transmission of signals propagating through the coaxial feed line. Additionally, the high pressure and high temperatures that a windshield is exposed to during the manufacturing process can damage and impact the integrity of a larger coaxial cable in particular.

Thus, there is a need for a low profile, high performance antenna capable of being incorporated, for example, within an automotive vehicle window panel, and with an associated feed line that can withstand the windshield fabrication environment without negatively affecting the performance of the antenna after installation.

SUMMARY

An aspect of the disclosure is directed to high performance antennas suitable for incorporation in glass, e.g. between glass layers. Suitable antennas comprise: a radiating element; a ground plane element; and a transmission line extending across at least a portion of the radiating element and the ground plane element, the transmission line comprising: a dielectric layer, the dielectric layer having a portion of a first surface adjacent to the ground plane element and a second major surface opposite and separated from the first surface; a shield formed on the second major surface; a via extending through the dielectric layer to connect the shield to the ground plane element; a feed line extending longitudinally through the dielectric layer from a feed point at a proximal end of the transmission line towards a distal end of the transmission line, the feed line being shielded along a portion of the feed line length that extends across the ground plane element by the shield with the distal end of the transmission line lying in register with the radiating element and coupling the feed line to the radiating element. In some configurations, the radiating element and the ground plane element define a slot therebetween. Additionally, the radiating element and the ground plane element are further configurable to define an aperture and a tapered channel connected by the slot therebetween. Further, an outer shape of the antenna radiating element and the ground plane can comprise, for example, a rectangle. Additionally, the transmission line can be configured to straddle the slot. In some configurations, the feed line straddles the slot. The dielectric layer can further be configurable to comprise at least one of a flexible material and a rigid material. Suitable antennas can be selected from the group comprising: a Global Navigation Satellite System (GNSS) antenna, an LTE antenna, a 5G antenna, a DSRC antenna, a Bluetooth antenna and a Wi-Fi antenna. Additionally, the distal end of the feed line is spaced apart from and electromagnetically coupled to the radiating element. The distal end of the feed line can further be configured to connect to the radiating element through a via. In at least some configurations, the feed line comprises any one or more of: a stripline, a microstrip, a co-planar waveguide and a co-planar waveguide with ground. The distal end of the transmission line can also be positioned so that it is lying in register with the radiating element is supported by at least a portion of the dielectric layer. The antenna radiating element and co-planar ground plane element can also be formed of a metallic material comprising copper, aluminum, gold, or silver. A pair of vias can be provided straddling the feed line. In some configurations, a plurality of pairs of vias can be provided which are distributed along a length of the feed line.

Another aspect of the disclosure is directed to window panels having one or more antennas. Suitable configurations comprise: a first glass layer and a second glass layer; the one or more antennas comprising a radiating element, a ground plane element, and a transmission line extending across at least a portion of the radiating element and the ground plane element, the transmission line comprising a dielectric layer, the dielectric layer having a portion of a first surface adjacent to the ground plane element and a second major surface opposite and separated from the first surface, a via extending through the dielectric layer to connect the shield to the ground plane element, a feed line extending longitudinally through the dielectric layer from a feed point at a proximal end of the transmission line towards a distal end of the transmission line, the feed line being shielded along a portion of the feed line length that extends across the ground plane element by the shield with the distal end of the transmission line lying in register with the radiating element and coupling the feed line to the radiating element, wherein the one or more antennas are incorporated between the first glass layer and the second glass layer with a respective one or more transmission lines extending from between the first glass layer and the second glass layer for connecting the one or more antennas to a communications module. The first glass layer and the second glass layer can also be laminated together with a plastic layer therebetween. Additionally, the radiating element and the ground plane element for the one or more antennas can be formed directly on a glass layer or a laminated substrate of the window panel. The one or more antennas can also be pre-fabricated before incorporating between the first glass layer and the second glass layer. When the antennas are pre-fabricated, the antennas can be pre-fabricated on a common substrate. The window panel can be, but is not limited to, a vehicle windshield.

INCORPORATION BY REFERENCE

All publications, patents, and patent applications mentioned in this specification are herein incorporated by reference to the same extent as if each individual publication, patent, or patent application was specifically and individually indicated to be incorporated by reference:

U.S. Pat. No. 4,870,375 A to Krueger et al. issued Sep. 26, 1989 for Disconnectable microstrip to stripline transition;
U.S. Pat. No. 6,677,909 B2 to Sun et al. issued Jan. 13, 2004 for Dual band slot antenna with single feed line;
U.S. Pat. No. 7,271,779 B2 to Hertel issued Sep. 18, 2007 for Method, system and apparatus for an antenna;
U.S. Pat. No. 8,362,958 B2 to Lin et al. issued Jan. 29, 2013 for Aperture antenna;
U.S. Pat. No. 8,427,373 B2 to Jiang et al. issued Apr. 23, 2013 for RFID patch antenna with coplanar reference ground and floating grounds;
U.S. Pat. No. 9,166,300 B2 to Taura issued Oct. 20, 2015 for Slot antenna;
U.S. Pat. No. 9,472,855 B2 to Toyao et al. issued Oct. 18, 2016 for Antenna device;
U.S. Pat. No. 9,653,807 B2 to Binzer et al. issued May 16, 2017 for Planar array antenna having antenna elements arranged in a plurality of planes;
U.S. Pat. No. 9,660,350 B2 to Tong et al. issued May 23, 2017, for Method for creating a slot-line on a multilayer substrate and multilayer printed circuit comprising at least one slot-line realized according to the method and using an isolating slot antenna;
U.S. Pat. No. 9,391,372 B2 to Hwang et al. issued Jul. 12, 2016 for Antenna;
US 2014/0111393 A1 to Tong et al. published Apr. 24, 2014 for Compact Slot Antenna;
US 2015/0091763 A1 to Tong et al. published Apr. 2, 2015 for Antenna assembly for electronic device;
US 2016/0134021 A1 to Helander et al., published May 12, 2016 for Stripline coupled antenna with periodic slots for wireless electronic devices;
KR 101209620 B1 issued Jul. 12, 2012 for Antenna; and
Mudegaonkar, et al. A micostrip-line-fed suspended square slot microstrip antenna for circular polarization operations, Communications on Applied Electronics 1(3) February 2015.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE PREFERRED EMBODIMENT

Figure 1A:
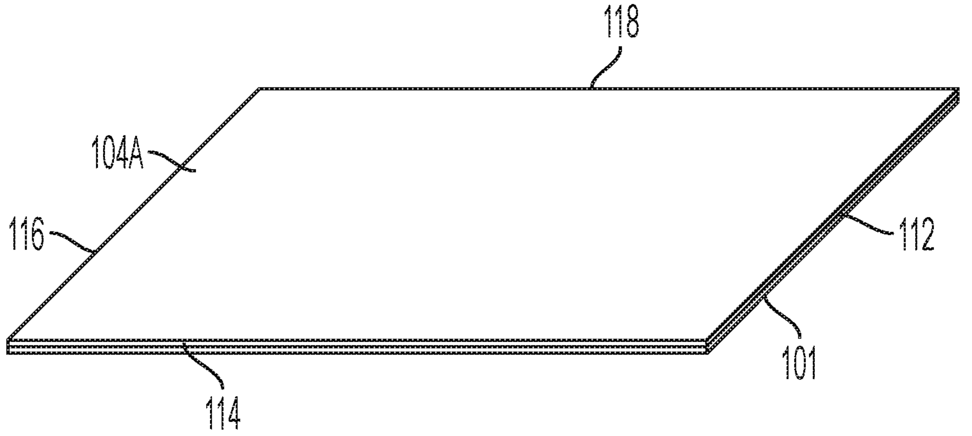
FIGS. 1A-C illustrate steps from one method for producing an antenna according to an embodiment of the disclosure.
Figure 1B:
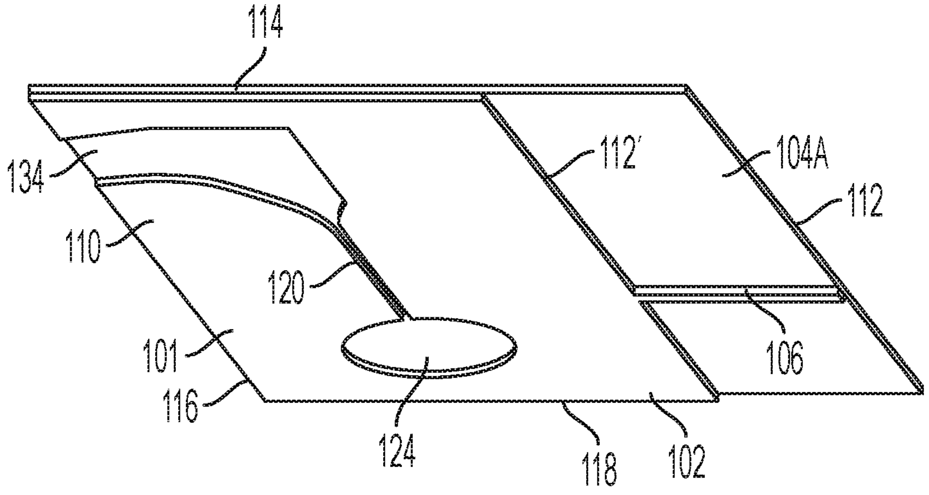
Figure 1C:
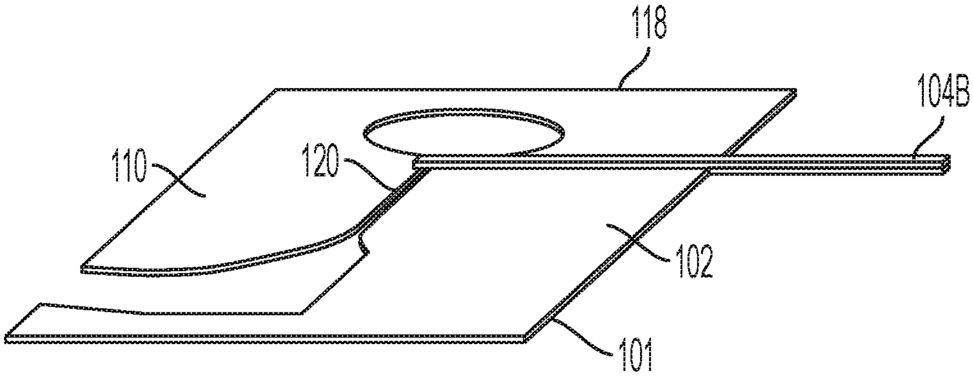
Figure 2:
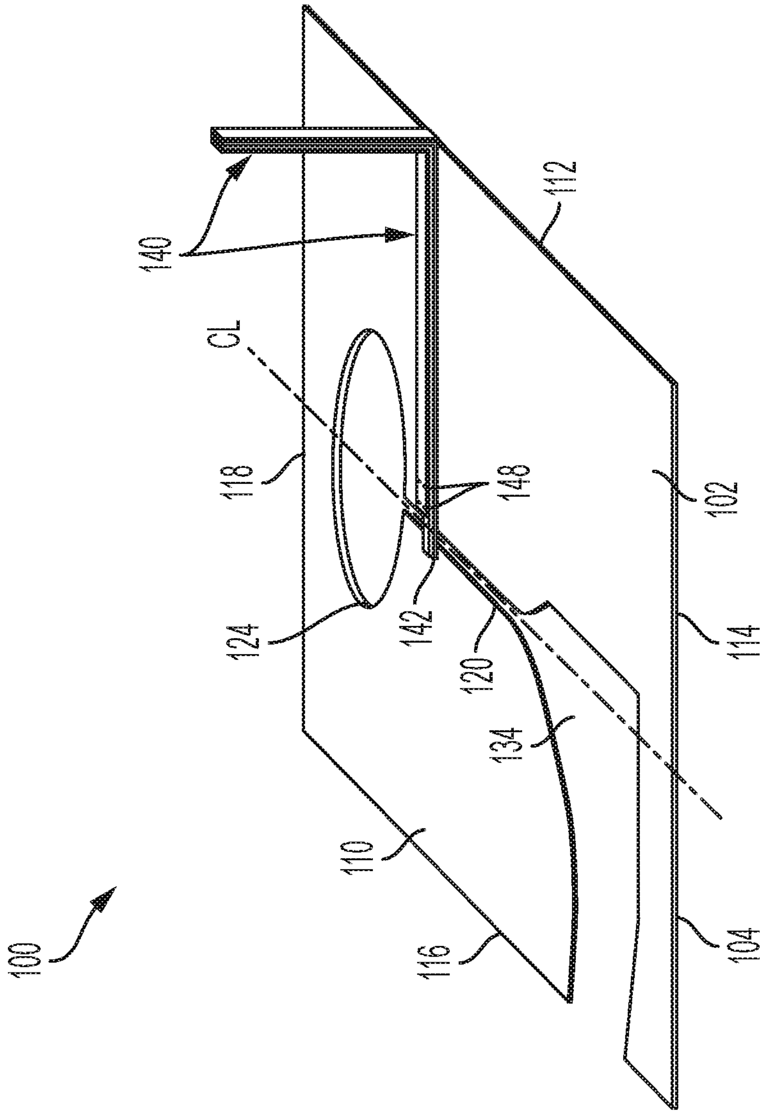
FIG. 2 is an isometric illustration of the antenna produced according to FIG. 1 and in which the feed line has been bent to enable the feed line to be supplied from a side of a window panel.

Referring now to FIGS. 1A-C, some steps of an exemplary method for fabricating an antenna 100 of FIG. 2 according to the disclosure are illustrated. In FIG. 1A, there is shown a first substrate 104A wherein a first side of the first substrate 104A is coated with a conductive material 101. The first substrate 104 A is illustrated with a rectangular shape having a first side 112, a second side 114, a third side 116, and a fourth side 118. Examples of conductive material 101 suitable for coating the first substrate 104A include, but are not limited to, a glass-reinforced epoxy laminate such as fiberglass resin (FR4) and Kapton® polyimide film available from Dupont, while suitable conductive materials include copper, aluminum, gold or silver.

During the fabrication process, the conductive material 101 is masked to define an antenna configuration/shape and then etched to remove portions of the conductive material 101 that does not form part of the antenna. As shown in FIG.

1B, where the first substrate 104A is a flipped view of FIG. 1A, the antenna configuration/shape comprises a radiating element 110 generally separated from a ground plane 102 by a tapered channel 134, slot 120 and an aperture 124 with a strip comprising a transmission line base layer 106 for a transmission line extending from a side 112' of the ground plane 102 of the antenna. As shown in FIG. 1B, the first side 112 of the first substrate 104A is not coextensive with the first side 112' of the ground plane 102. As will be appreciated by those skilled in the art, any variety of antenna shapes can be defined at this stage of the process, but it is desirable in each case to provide for a transmission line 106 extending from a side of the antenna to facilitate connection of the antenna to receiver/transmitter/transceiver circuitry.

In the next step, shown in FIG. 1C, the first substrate 104A is patterned to remove all but a layer of dielectric material to leave a first substrate remainder 104B portion extending along the length of the transmission line base layer 106, across the ground plane 102 and, in the present example, traversing the slot 120 and extending partly over the radiating element 110. It will be appreciated that at this stage, the conductive material 101 may be a patterned layer that is quite fragile and so a temporary carrier (not shown) can be provided to support the ground plane 102 of the radiating element 110 from its surface opposite the first substrate remainder 104B portion during subsequent processing.

Figure 3:
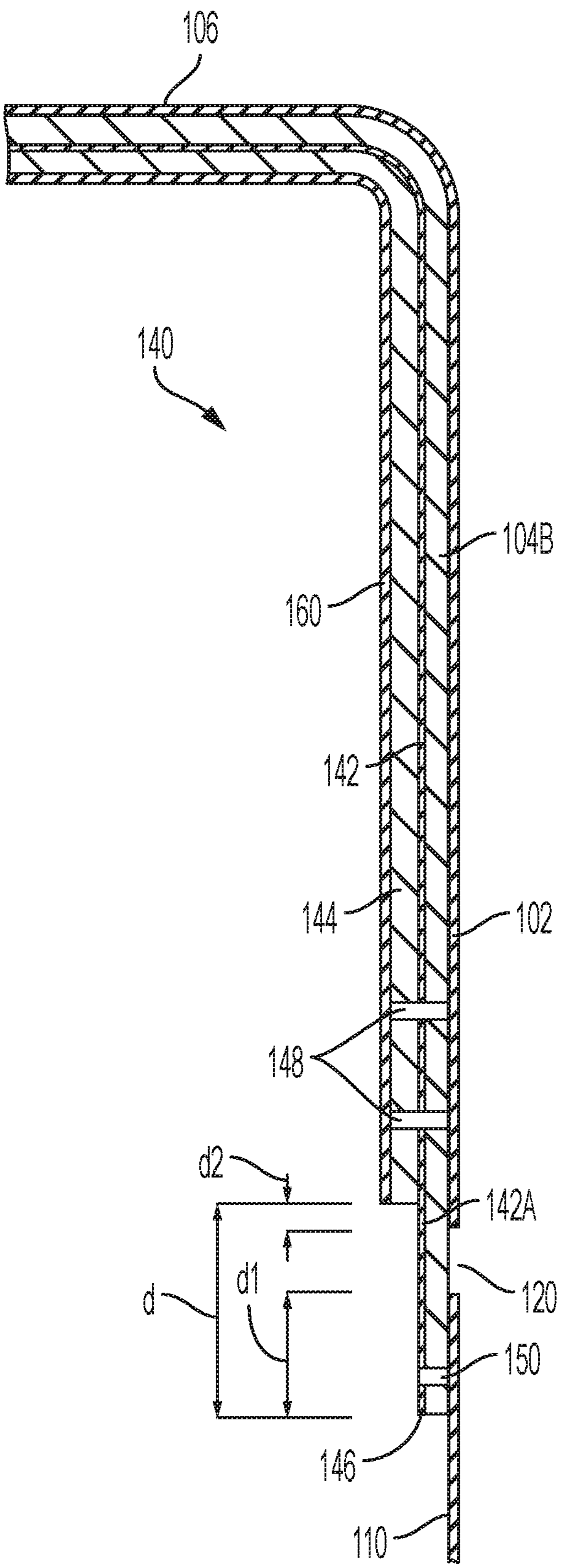
FIG. 3 is a cross-section of a portion of the antenna produced according to FIG. 1.

Referring now to FIG. 2, in order to complete the assembly of the antenna 100, a second substrate 144, such as a dielectric substrate layer, having a first side coated with a conductive material which is a shield 160 is provided. The second substrate 144 corresponds in shape with the first substrate remainder 104B shown in FIG. 1C except that it is marginally shorter as illustrated in FIG. 3.

Before the second substrate 144 is combined with the first substrate remainder 104B, a feed line 142 is located between the substrates, the feed line 142 running longitudinally along the first substrate remainder 104B from a first substrate remainder distal end remote from the ground plane 102 to a proximal point where the first substrate remainder 104B overlies the radiating element 110. The three components can now be bonded using any of: adhesive, pressure, or adhesive and pressure possibly in combination with another other technique to provide a nascent shielded transmission line 140.

In FIG. 2, two pairs of vias 148 are shown with each pair straddling the feed line 142. However, it will be appreciated that in variants of the embodiment, any number of vias, pairs of vias or arrangements of vias can be formed along the length of the transmission line 140, as required. It will also be appreciated that these vias once complete can maintain the first 104B and second 144 substrates together and so the original bonding of the substrates may only need to be suitable for temporary bonding.

An end via 150 can be formed towards the end of the first substrate remainder 104B to electrically connect the feed line 142 to the radiating element 110. Nonetheless, it will be appreciated that in variants of the embodiment, no via may be required and in this case, the end of the feed line would only be coupled to the radiating element. In either case, the first substrate remainder 104B need not extend across either the slot 120 or the radiating element 110 i.e. the slot 120 could be co-terminus with the second substrate 144.

Referring back to FIG. 2, as described, the antenna 100 comprises a radiating element 110, a ground plane 102 (which can be a co-planar ground plane element), and a transmission line 140. A feed line 142 is also provided which spans a centerline CL of the slot 120 at a right angle, the feed line 142 extends across at least a portion of the ground plane 102 and the radiating element 110 by a distance d1. As illustrated, the outer shape of the antenna 100 is rectangular having a first side 112, a second side 114, a third side 116, and a fourth side 118, numbered clockwise as viewed in the illustration. The slot 120 is arranged so that the longitudinal centerline CL of the slot extends parallel to the first side 112 and the third side 116. Note that the centerline CL may be positioned off center along the length of the first side 112 and the third side 116. An aperture 124, depicted as a circular aperture, is provided at one end of the slot 120 within the body of the antenna 100 with the aperture 124 of the slot 120 straddling the centerline CL. A tapered channel 134 extends from the slot all the way to the third side 116. When the aperture 124 is a circular aperture, the aperture 124 can have a diameter up to approximately half the length of either the first side 112 or the third side 116. The tapered channel 134 is narrowest where the tapered channel 134 meets the slot 120 and gradually widens as the tapered channel 134 approaches the third side 116. Note that the slot 120 does not need to have parallel sides and in one embodiment the width of the slot 120 at its narrowest point adjacent the aperture 124 is approximately 3% the diameter of the aperture 124, while, at its widest point before the slot 120 expands into the tapered channel 134, the width of the slot 120 is approximately 5% the diameter of the aperture 124. Thus, the configuration of the slot 120 is typical for a slot antenna. The transmission line 140 straddles the slot 120 near the point on the antenna 100 where the slot 120 meets the aperture 124. In the embodiment, the transmission line crosses the center line of the slot 120 at a right angle.

The transmission line 140 comprises the second substrate 144, a feed line 142 which extends longitudinally through the dielectric substrate layer from a feed point at a distal end of the transmission line towards the end overlying the radiating element 110. In one embodiment, the feed line 142 arrangement comprises a conductive metal stripline. The feed line 142 may be provided resting atop the transmission line of the second substrate 144 thus forming, for example, a microstrip. The microstrip may have additional conductive metal strips running alongside and adjacent to the feed line 142 microstrip thus forming a co-planar waveguide or a co-planar waveguide with ground. In the embodiment depicted, the feed line 142 runs along the entire length and has a thickness approximately one eighth that of the second substrate 144. Visible in FIG. 2, are the top surfaces of a plurality of transmission line vias 148. The transmission line vias 148 are composed of a suitable electrically conductive material. The transmission line vias 148 extend through the second substrate 144 to connect the shield 160 to the ground plane 102 so as to provide an electrically conductive connection on one side of the tapered channel 134 between the shield 160 and the ground plane 102. Although not shown, the plurality of transmission line vias 148 will extend from the vias as shown in FIG. 2 along the length of the transmission line towards a proximal end of the transmission line.

The transmission line 140 may be in the form of a microstrip that runs within the second substrate 144 along the entire length of the transmission line 140. Like the feed line 142, the microstrip is composed of a conductive metal material. The transmission line 140 is approximately one quarter as wide as the second substrate 144 and has a thickness approximately one eighth that of the second substrate 144. The transmission line 140 is centered within the width of the second substrate 144 of the transmission line and is approximately centered within the thickness of the second substrate 144.

FIG. 3 depicts a cross-section illustrating a portion of the internal details of the connection of the transmission line 140 to the radiating element 110 and ground plane 102. The feed line 142 is depicted as extending across at least a portion of the radiating element 110 and the ground plane 102 straddling the slot 120 near the point (not shown) on the radiating element 110 where the slot 120 meets the aperture 124 shown in FIG. 2. Also visible in FIG. 3, are two of the transmission line vias 148 extending through the second substrate 144 to connect the shield 160 to the ground plane 102. Once assembled, a number of vias 148 can be formed along the length of the transmission line to electrically connect the shield 160 to the transmission line base layer 106 and thus the ground plane 102.

Also, a portion d of transmission line 140 comprises only the first substrate remainder 104B portion and with an exposed section of feed line 142A extending across at least a portion of the ground plane 102 and radiating element 110 terminating at slot 120. The first substrate remainder 104B in the portion d of the transmission line is optional and provides support for the feed line 142A that extends across at least the portion d1 of the radiating element 110 and at least the portion d2 of the ground plane 102.

A microstrip via 150 is formed adjacent microstrip near an end of the feed line 142 and completes the conductive connection from the feed line 142 to the surface of the radiating element 110. The microstrip via 150 connects to the surface of the radiating element 110 on the side of the tapered channel 134 opposite that which the vias 148 connect. Although FIG. 3 illustrates the via 150 extending from the microstrip 146 to the radiating element 110, the transmission line 140 can also be configured such that a distal end of transmission line 140 lies space apart from and in register with the radiating element 110 electromagnetically coupling the feed line 142 to the radiating element 110.

In operation, connecting the transmission line 140 to a voltage source induces a voltage across the tapered channel 134, slot 120 and the aperture 124 which, in turn, creates an electric field distribution around the slot (not shown).

As can be seen in FIG. 2 and FIG. 3, once completed, the transmission line 140 can be bent at a point along its length away from the ground plane. In FIG. 2, the bend is shown at the edge of the ground plane 102, but as will be appreciated by those skilled in the art, a bend at the edge of the ground plane 102 is not the only suitable location for a bend. Bending the transmission line in this manner enables the body of the antenna to be located within for example the laminated layers of a window panel (as explained below) while connecting to electronics components which may lie out of the plane of the window panel.

Figure 4:
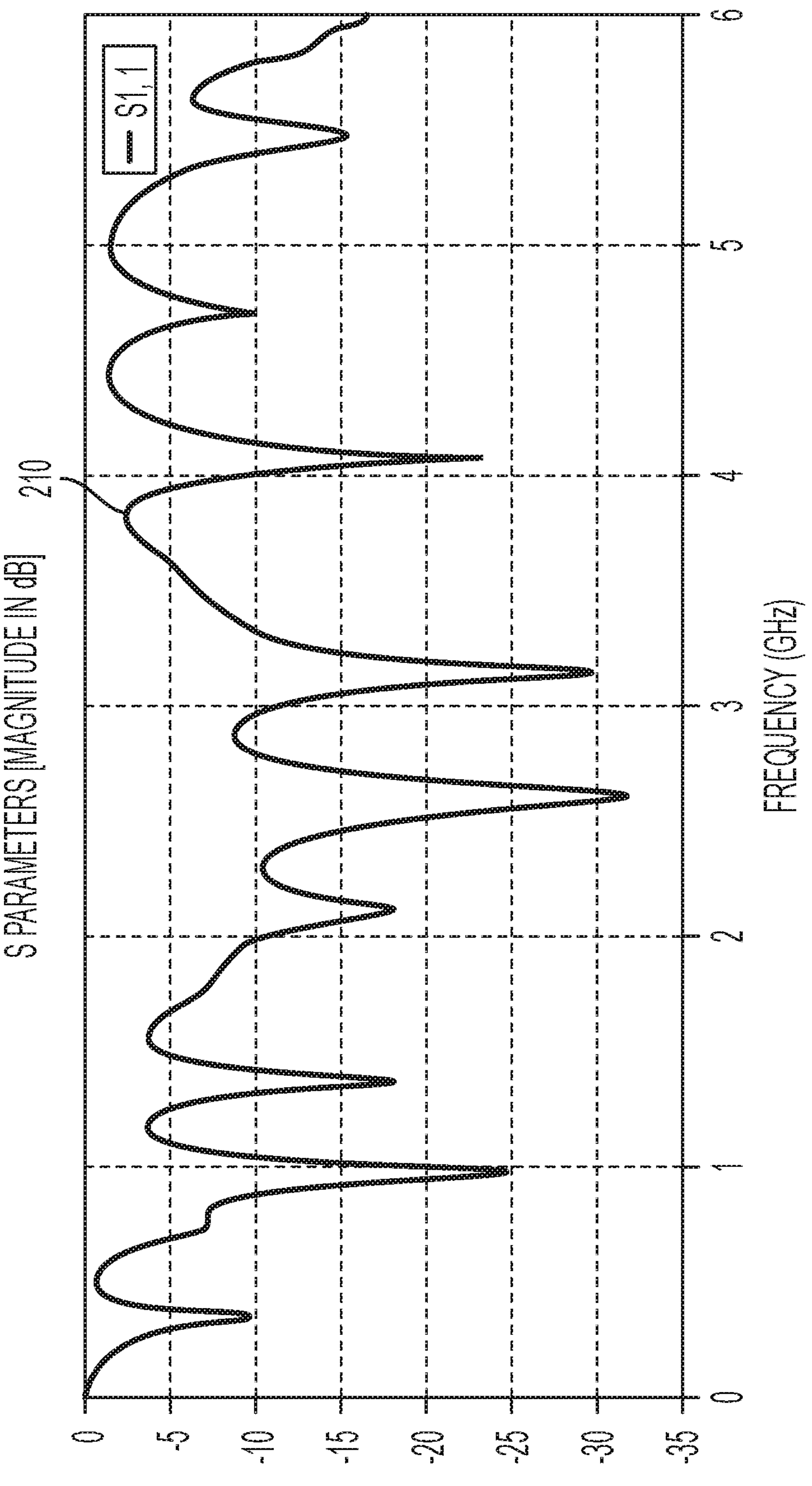
FIG. 4 is the simulated return loss of a slot antenna with a PCB transmission line attached.

Turning now to FIG. 4, a simulated return loss 210 of the antenna 100 shown in FIG. 2 is illustrated, the return loss is plotted across the frequency domain from 0 gigahertz (GHz) to 6 GHz. The plot is typical of a slotted antenna of the configuration described in the embodiment presented in FIG. 2. The simulated return loss 210 consists of a series of continuous concave-down quasi-parabolic shapes spanning the range from 0 GHz to 6 GHz. The maxima range from O decibel (dB) at O GHz to approximately −11 dB at approximately 2.3 GHz. The minima range from approximately −9 dB at approximately 0.2 GHz to approximately −32 dB at approximately 2.6 GHz.

Figure 5:
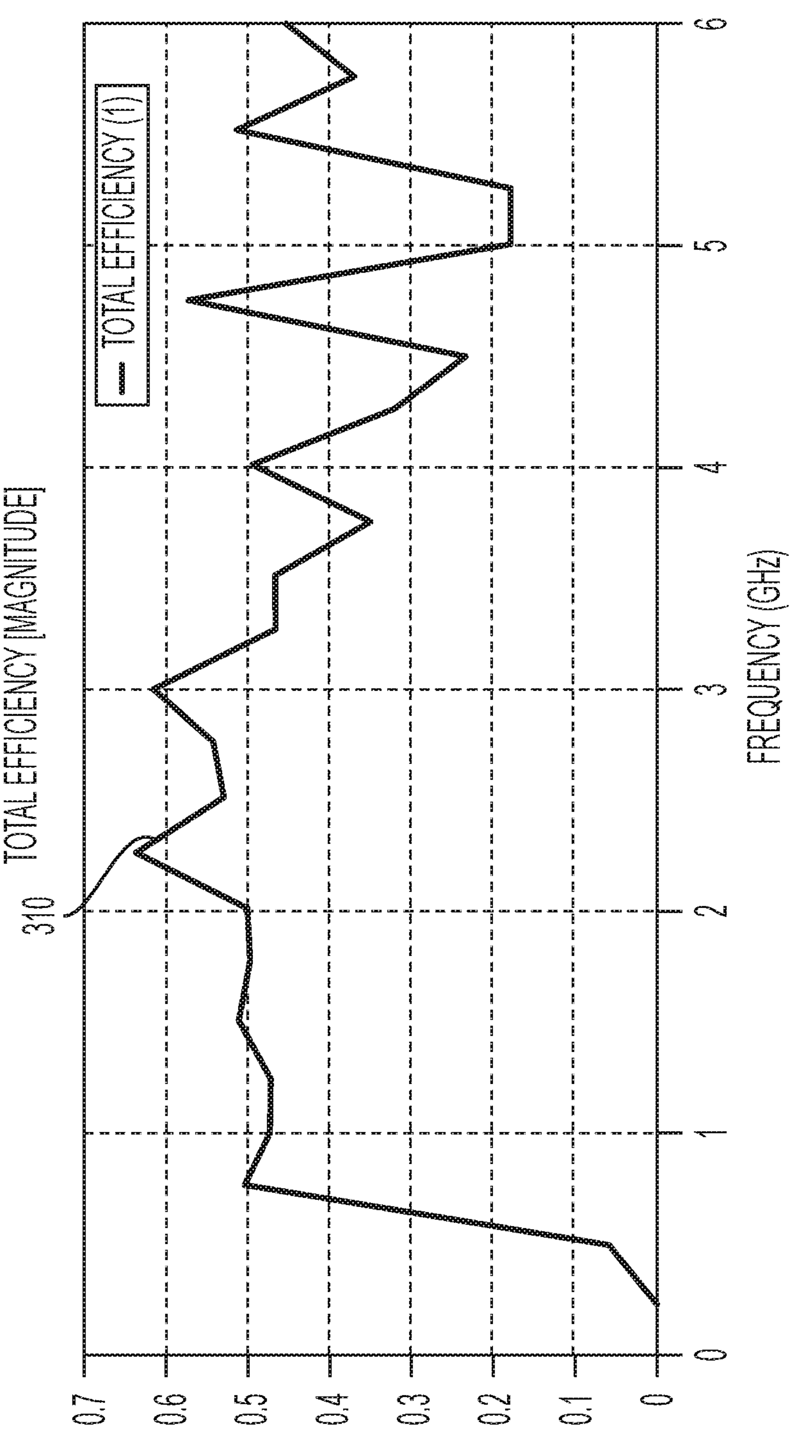
FIG. 5 is the simulated total efficiency of a slot antenna with a PCB transmission line attached.

FIG. 5 is a plot of the simulated total efficiency 310 of the antenna 100 illustrated in FIG. 2 across the frequency domain from 0 GHz to 6 GHz. The plot is typical of a slotted antenna of the configuration described in the embodiment presented in FIG. 2. The simulated total efficiency 310 exhibits a local maxima of approximately 63% at 2.3 GHz and 61% at 3 GHz.

While the embodiment depicted in FIG. 2 illustrates a specific configuration of a slot antenna, the disclosure is applicable to antennas in general. Thus, while the antenna 100 produced according to the above example is a Vivaldi slot antenna, the disclosure is applicable to any antenna design which can be implemented with a planar conductor including for example a monopole antenna, dipole antenna, a Dedicated Short-Range Communications (DSRC), Global Navigation Satellite System (GNSS) antenna or Wi-Fi antenna.

Figure 6A:
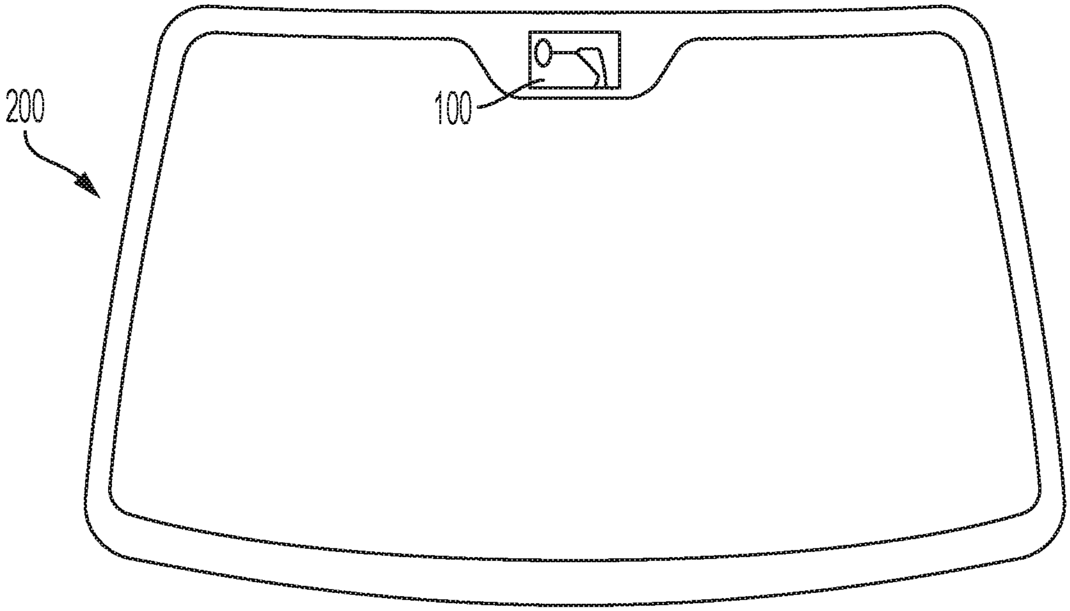
FIG. 6A shows a location for the antenna of FIG. 2 incorporated into a vehicle windshield.
Figure 6B:
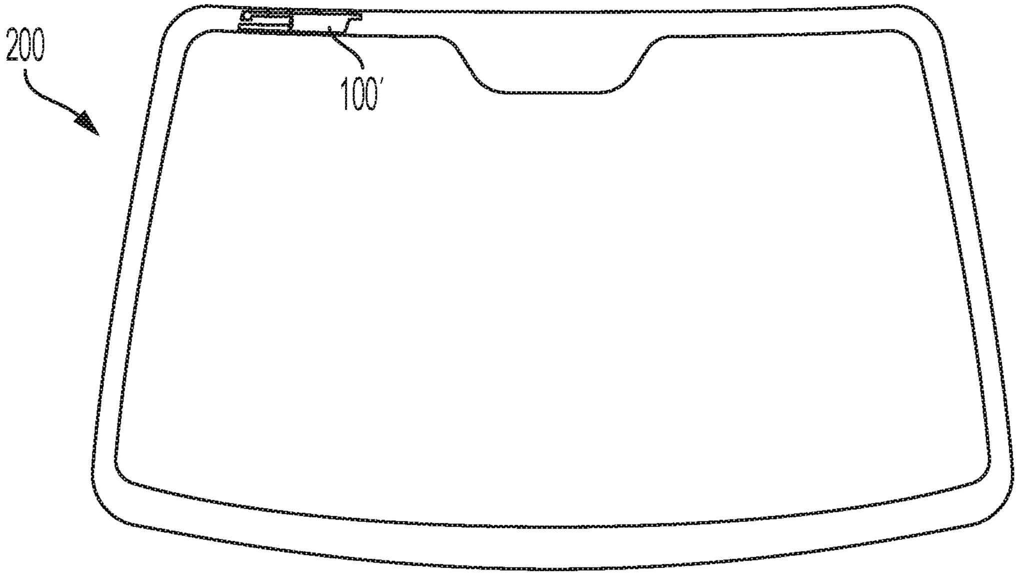
FIG. 6B shows an alternative windshield location for a variant of the antenna of FIG. 2.
Figure 6C:
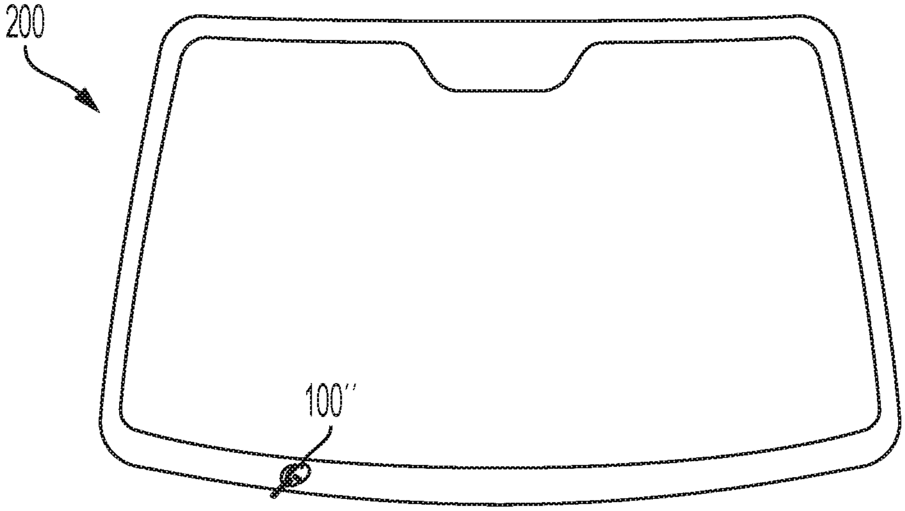
FIG. 6C shows a further alternative windshield location for another variant of the antenna of FIG. 2.
Figure 6D:
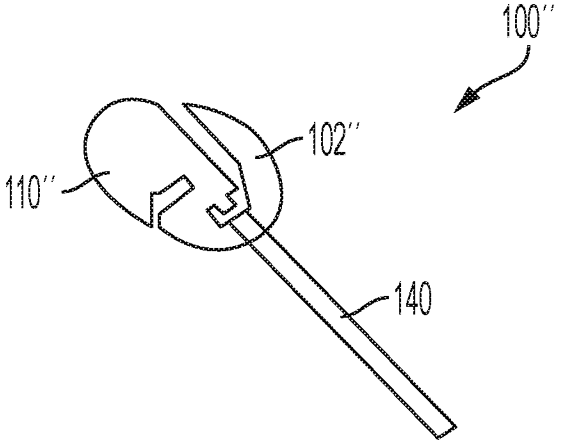
FIG. 6D shows the variant of the antenna in FIG. 6C in more detail.

FIGS. 6A-C illustrate the placement for a variety of antenna configurations including antenna 100 in FIG. 6A, antenna 100' in FIG. 6B, and antenna 100" in FIG. 6C according to various embodiments of the present disclosure in a windshield 200 of an automobile. FIG. 6A shows a location for the antenna of FIG. 2 within the windshield 200, with FIG. 6B showing an alternative location for the antenna 100' which is a variant of the antenna 100 illustrated in FIG. 2 within the windshield 200 and FIG. 6C showing a further alternative location for another antenna 100" which is a variant of the antenna 100 shown in FIG. 2 within the windshield 200. Multiple antennas can be located in the windshield 200. The antennas can be a combination of different types of antennas. The placement of the antennas are provided for illustrative purposes and provided by way of example only and are not limiting. FIG. 6D illustrates antenna 100" shown in FIG. 6C in more detail. The antenna 100" has a radiating element 110", a ground plane 102", and a transmission line 140.

Figure 7:
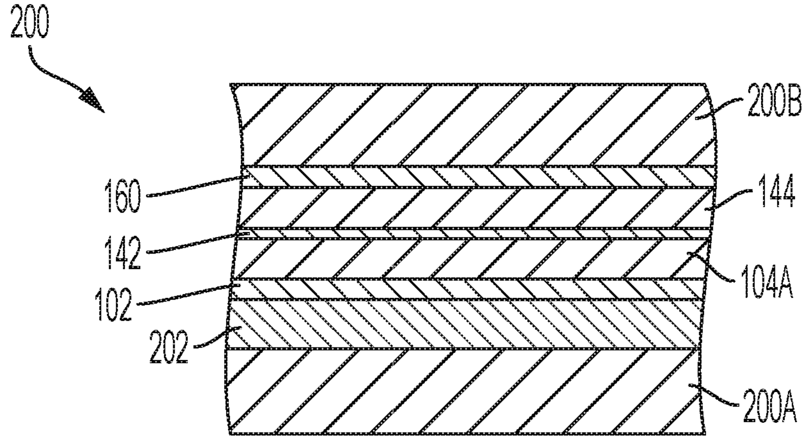
FIG. 7 shows a cross-section view of the antenna of FIG. 2 in-situ within a windshield.

FIG. 7 shows a cross-section view of the antenna of FIG. 2 in-situ within a windshield 200. The windshield 200 comprises at least two glass layers, first glass layer 200A and second glass layer 200B, with an antenna located between the first glass layer 200A and second glass layer 200B. Located on a first surface of one of the first glass layer 200A is a plastic layer 202 and located on a surface of the plastic layer, the surface being that surface which is opposite surface that is adjacent to the first glass layer 200A, is the antenna of FIG. 2 or a variant of the antenna shown in FIG. 6B or FIG. 6C. A ground plane 102, is adjacent the plastic layer 202 on one side and the first substrate 104A. The remainder of the first substrate 104A is adjacent the feed line 142. The feed line 142 is adjacent the second substrate 144, and the shield 160 is positioned between the second glass layer 200B and the second substrate 144.

Figure 8:
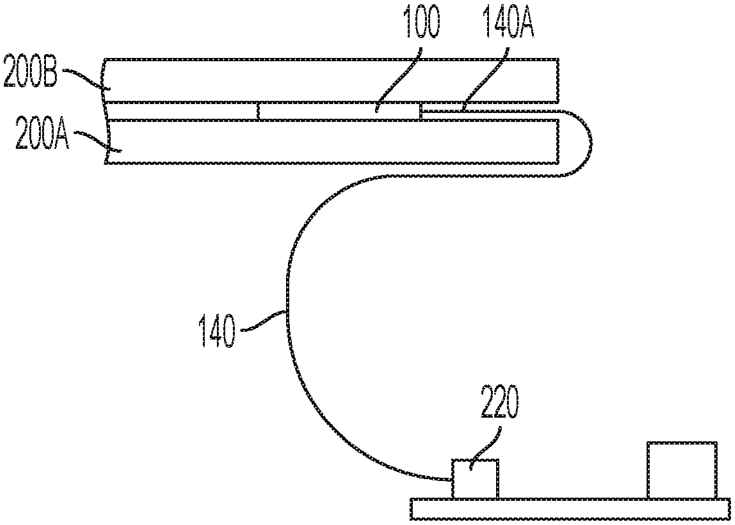
FIG. 8 shows an antenna of the embodiments connected to driver circuitry.

FIG. 8 shows an antenna 100 located between the first glass layer 200A and the second glass layer 200B of a windshield 200 and connected to a communications module including driver circuitry 220. The antenna 100 is connected to the driver circuitry 220 by the transmission line 140, the distal end 140A of the transmission line being connected to the antenna and extending from between the first glass layer 200A and second glass layer 200B of the windshield 200 for connecting to the driver circuitry 220 external to the windshield.

As will be appreciated by those skilled in the art, while the antennas 100, 100' and 100" have been described as being provided as a pre-fabricated sub-assembly module fitted on a glass or laminated substrate of a window panel, such as a windshield, for subsequent incorporation within the window panel, it is also possible, to produce antenna traces for more than one antenna on a given substrate and for these to be connected to separate feed lines.

Figure 9:
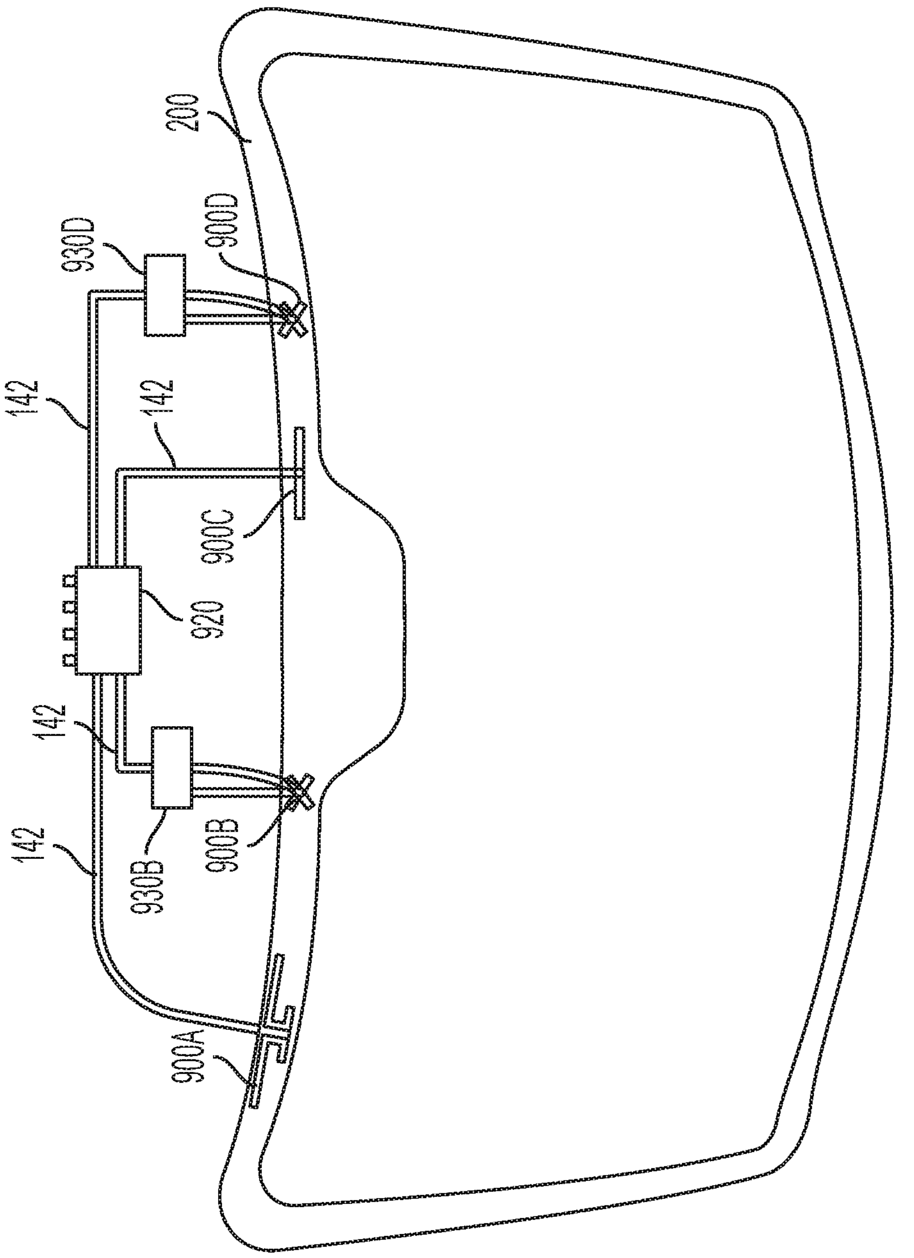
FIG. 9 shows a windshield incorporating a plurality of different antennas according to various embodiments of the disclosure.

Also, it is possible to print the traces for one or more antennas directly on a glass or laminated substrate of the window panel before fixing the transmission line to the traces and subsequent incorporation within the window panel. Referring to FIG. 9, a windshield 200 is illustrated incorporating a dipole LTE antenna 900A, a GNSS antenna 900B, a Wi-Fi antenna 900C and a DSRC antenna 900D, each with one or more respective feed lines 142A . . . '142B converging on a connector 920. In the case of the GNSS antenna 900B and DSRC antenna 900D, a pair of feed lines are connected directly to the cross-dipole antenna traces and these are connected to the connector 920 via respective couplers 930B, 930D. Note that the feed lines are shown schematically, in practice, are likely to converge close to a common point on the edge of the windshield where they are fed to the connector 920.

Figure 10:
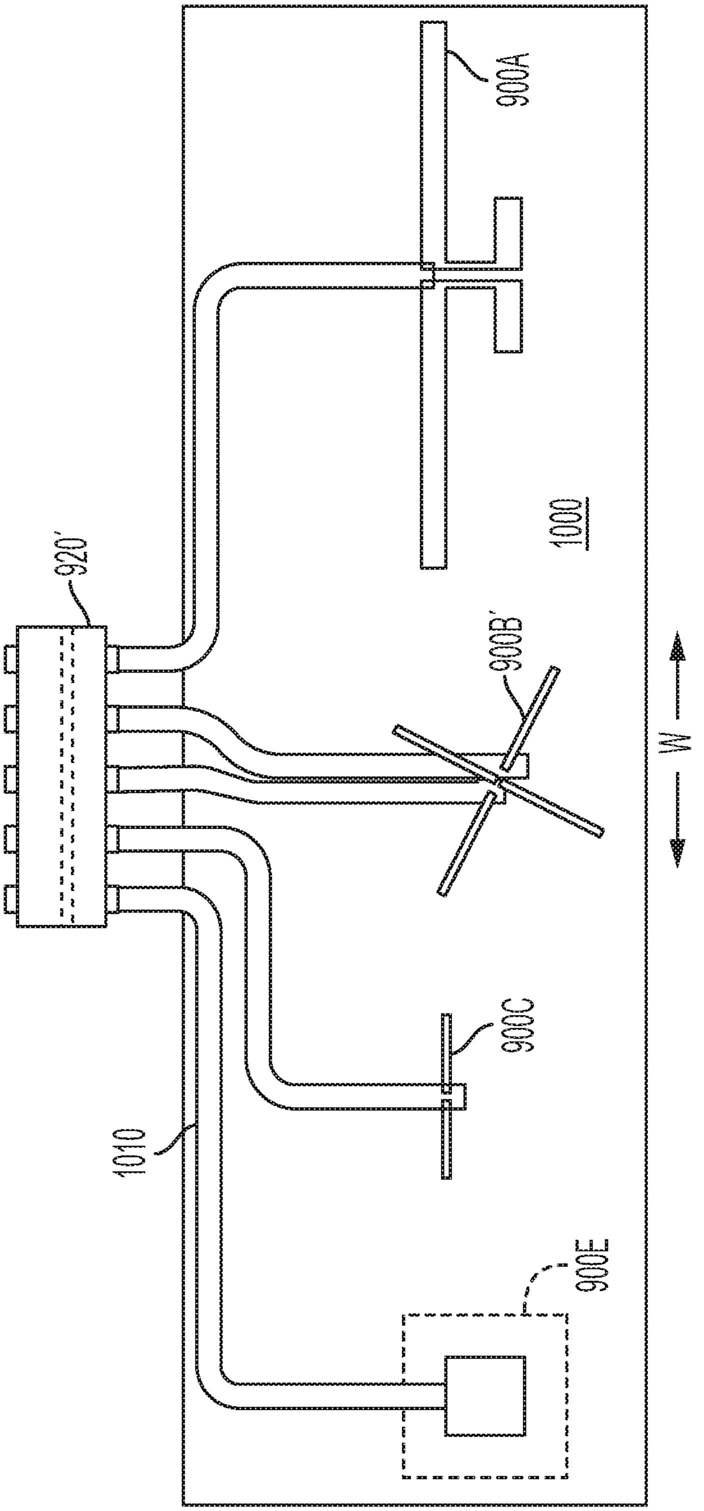
FIG. 10 shows a windshield incorporating a further variant comprising a plurality of different antennas according to various embodiments of the disclosure.

Referring now to FIG. 10, in one such arrangement a set of 4 antennas including a DSRC patch antenna 900E (instead of the cross-dipole of FIG. 9), a Wi-Fi antenna 900C, a GNSS antenna 900B' and a dipole LTE antenna 900A are constructed on a common substrate 1000 which is located along an edge 1010 of a window panel within a blacked out region towards the edge of the window panel. In this case, both feed lines of the GNSS antenna 900B' are connected directly to a connector 920' (without a discrete coupler 930 as in FIG. 9).

In order to provide an idea of the scale of these devices, in the direction W shown, the dipole LTE antenna 900A is approximately 120 mm wide, the GNSS antenna 900B' is approximately 60 mm wide, the Wi-Fi antenna 900C is approximately 25 mm wide and the DSRC patch antenna 900E is approximately 30 mm wide.

While preferred embodiments of the present invention have been shown and described will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An antenna comprising:
- a radiating element;
- a ground plane; and
- a transmission line that is coupled with both the radiating element and the ground plane, the transmission line comprising:
  - a dielectric layer, the dielectric layer having a portion of a first surface adjacent to the ground plane and a second major surface opposite and separated from the first surface;
  - a shield formed on the second major surface;
  - a via extending through the dielectric layer to connect the shield to the ground plane;
  - a feed line extending through the dielectric layer from a feed point at a first end of the transmission line towards a second end of the transmission line, at least a portion of the feed line being disposed between the shield and the ground plane.

2. The antenna according to claim 1, wherein the radiating element and the ground plane collectively define a slot that is disposed between the radiating element and the ground plane.

3. The antenna according to claim 2, wherein the radiating element and the ground plane further define an aperture and a tapered channel with the slot being disposed between the aperture and the tapered channel.

4. The antenna according to claim 3, wherein an outer perimeter of the radiating element and the ground plane comprises a rectangle.

5. The antenna according to claim 2, wherein the transmission line is disposed on both sides of the slot.

6. The antenna according to claim 2, wherein the radiating element is connected with the feed line through use of a conductive via.

7. The antenna according to claim 1, wherein the dielectric layer comprises a flexible material.

8. The antenna according to claim 1, wherein the antenna is an antenna selected from the group consisting of:
- a Global Navigation Satellite System (GNSS) antenna, an LTE antenna, a 5G antenna, a DSRC antenna, a Bluetooth antenna and a Wi-Fi antenna.

9. The antenna according to claim 1, wherein the second end of the transmission line is spaced apart from and electromagnetically coupled to the radiating element.

10. The antenna according to claim 1, wherein the second end of the feed line is connected to the radiating element through a via.

11. The antenna according to claim 1, wherein the feed line comprises any one or more of:
- a stripline, a microstrip, a co-planar waveguide and a co-planer waveguide with ground.

12. The antenna according to claim 1, wherein the second end of the transmission line is supported by at least a portion of the dielectric layer.

13. The antenna according to claim 1, wherein the radiating element and the ground plane element are formed of a metallic material comprising copper, aluminum, gold, or silver.

14. The antenna according to claim 1 comprising a pair of vias straddling the feed line.

15. The antenna according to claim 14 comprising a plurality of pairs of vias distributed along the length of the feed line.

16. A window panel having an antenna comprising:
- a first glass layer and a second glass layer;
- the antenna comprising a radiating element, a ground plane, and a transmission line, the transmission line comprising a dielectric layer, the dielectric layer having a portion of a first surface adjacent to the ground plane and a second major surface opposite and separated from the first surface, a via extending through the dielectric layer to connect a shield to the ground plane, a feed line extending through the dielectric layer from a feed point at a first end of the transmission line towards a second end of the transmission line, the feed line being shielded along a portion of a length of the feed line that extends across the ground plane by the shield;
- wherein the antenna is incorporated between the first glass layer and the second glass layer with the transmission line extending from between the first glass layer and the second glass layer for connecting the antenna to a communications module.

17. A window panel according to claim 16, wherein the antenna is disposed on an upper portion of the window panel, the upper portion being disposed adjacent a roof of an automobile when the window panel is disposed thereon.

18. A window panel according to claim 17, wherein the antenna is disposed off-center from a centerline of the window panel.

19. A window panel according to claim 16, wherein the antenna is disposed on a lower portion of the window panel, the lower portion being disposed adjacent a hood of an automobile when the window panel is disposed thereon.

20. A window panel according to claim 19, wherein the antenna is pre-fabricated on a common substrate.

* * * * *